(12) United States Patent
Beaurepaire

(10) Patent No.: US 11,953,330 B2
(45) Date of Patent: Apr. 9, 2024

(54) METHOD TO INCREASE THE DISCOVERABILITY OF SHARED VEHICLES

(71) Applicant: HERE Global B.V., Eindhoven (NL)

(72) Inventor: Jerome Beaurepaire, Berlin (DE)

(73) Assignee: HERE GLOBAL B.V., Eindhoven (NL)

(*) Notice: Subject to any disclaimer, the term of this patent is extended or adjusted under 35 U.S.C. 154(b) by 219 days.

(21) Appl. No.: 17/503,739

(22) Filed: Oct. 18, 2021

(65) Prior Publication Data

US 2023/0117771 A1 Apr. 20, 2023

(51) Int. Cl.
| | |
|---|---|
| G01C 21/34 | (2006.01) |
| B60W 50/14 | (2020.01) |
| G01C 21/00 | (2006.01) |
| G06V 20/56 | (2022.01) |
| G06V 40/10 | (2022.01) |

(52) U.S. Cl.
CPC ........... *G01C 21/343* (2013.01); *B60W 50/14* (2013.01); *G01C 21/005* (2013.01); *G01C 21/34* (2013.01); *G01C 21/3407* (2013.01); *G01C 21/3415* (2013.01); *G06V 20/56* (2022.01); *G06V 40/10* (2022.01); *B60W 2050/146* (2013.01); *B60W 2420/42* (2013.01); *B60W 2555/20* (2020.02)

(58) Field of Classification Search
None
See application file for complete search history.

(56) References Cited

U.S. PATENT DOCUMENTS

| | | | | |
|---|---|---|---|---|
| 6,119,065 | A * | 9/2000 | Shimada | G08G 1/005 340/944 |
| 6,339,746 | B1 * | 1/2002 | Sugiyama | G08G 1/005 701/25 |
| 8,364,398 | B2 * | 1/2013 | Rossio | G01C 21/3644 701/445 |
| 8,370,060 | B2 * | 2/2013 | Rossio | G01C 21/3644 701/445 |
| 8,442,767 | B2 * | 5/2013 | Rossio | G01C 21/3644 701/438 |
| 9,803,988 | B2 * | 10/2017 | Barbieri | G01C 21/3679 |
| 10,106,172 | B2 * | 10/2018 | Wingfield | B60W 50/10 |
| 10,140,782 | B2 * | 11/2018 | Binion | G07C 5/008 |
| 11,167,756 | B2 * | 11/2021 | Shalev-Shwartz | B60W 30/09 |
| 11,377,102 | B2 * | 7/2022 | Shashua | B60W 60/0011 |
| 11,587,121 | B2 * | 2/2023 | Ueno | G08G 1/005 |
| 2008/0262714 | A1 * | 10/2008 | Abramovich Ettinger | G01C 21/34 701/533 |
| 2008/0262717 | A1 * | 10/2008 | Ettinger | G01C 21/34 701/467 |
| 2011/0054771 | A1 * | 3/2011 | Rossio | G01C 21/3644 701/532 |

(Continued)

FOREIGN PATENT DOCUMENTS

| | | | | |
|---|---|---|---|---|
| AU | 2010202507 A1 * | 3/2011 | ......... | G01C 21/3644 |
| AU | 2010202509 A1 * | 3/2011 | ......... | G01C 21/3644 |

(Continued)

*Primary Examiner* — Kevin R Steckbauer

(57) ABSTRACT

System and methods are provided for that allow users of micro mobility and shared mobility services to reduce the uncertainty related to the availability of a shared vehicle by quickly identifying such vehicles using a route that maximizes the visibility of the shared vehicle through line-of-sight computations.

18 Claims, 12 Drawing Sheets

(56) References Cited

U.S. PATENT DOCUMENTS

| | | | |
|---|---|---|---|
| 2011/0054772 A1* | 3/2011 | Rossio | G01C 21/3644 |
| | | | 701/532 |
| 2011/0054777 A1* | 3/2011 | Rossio | G01C 21/3644 |
| | | | 701/533 |
| 2013/0268193 A1* | 10/2013 | Kritt | G01C 21/3484 |
| | | | 701/533 |
| 2016/0187151 A1* | 6/2016 | Barbieri | G01C 21/3679 |
| | | | 701/540 |
| 2019/0283746 A1* | 9/2019 | Shalev-Shwartz | G06V 40/25 |
| 2020/0173796 A1* | 6/2020 | Beaurepaire | G01C 21/3415 |
| 2020/0223451 A1* | 7/2020 | Shashua | B60W 60/00274 |
| 2020/0378775 A1* | 12/2020 | Beaurepaire | G01C 21/3423 |
| 2021/0334854 A1* | 10/2021 | Ueno | G08G 1/005 |
| 2022/0242407 A1* | 8/2022 | Shashua | B60W 30/0956 |
| 2023/0117771 A1* | 4/2023 | Beaurepaire | G06V 20/56 |
| | | | 382/104 |

FOREIGN PATENT DOCUMENTS

| | | | | |
|---|---|---|---|---|
| CN | 102003964 A | * | 4/2011 | G01C 21/3644 |
| CN | 102003965 A | * | 4/2011 | G01C 21/3644 |
| CN | 110110896 A | * | 8/2019 | |
| CN | 112556716 A | * | 3/2021 | |
| CN | 112602130 A | * | 4/2021 | G06Q 30/0261 |
| CN | 112859831 A | * | 5/2021 | G01C 15/004 |
| CN | 112908014 A | * | 6/2021 | |
| CN | 115683136 A | * | 2/2023 | G01C 21/343 |
| EP | 2290323 A1 | * | 3/2011 | G01C 21/3644 |
| EP | 2290324 A1 | * | 3/2011 | G01C 21/3644 |
| EP | 2290325 A1 | * | 3/2011 | G01C 21/3644 |
| JP | 2001165693 A | * | 6/2001 | G01C 21/3644 |
| JP | 3749821 B2 | * | 3/2006 | G01C 21/3644 |
| JP | 2022061959 A | * | 4/2022 | G01C 17/38 |
| JP | 2022072972 A | * | 5/2022 | |
| JP | 2022185298 A | * | 12/2022 | |
| JP | 7264607 B2 | * | 4/2023 | G06Q 30/0261 |
| KR | 2020034914 A | * | 4/2020 | G01C 21/3423 |
| WO | WO-2019089591 A1 | * | 5/2019 | B60W 30/09 |
| WO | WO-2020040147 A1 | * | 2/2020 | G06Q 30/0261 |
| WO | WO-2022123664 A1 | * | 6/2022 | |
| WO | WO-2022255190 A1 | * | 12/2022 | |

* cited by examiner

METHOD TO INCREASE THE DISCOVERABILITY OF SHARED VEHICLES

FIELD

The following disclosure relates to navigation devices or services.

BACKGROUND

Electric scooters, docked and dockless shared bikes, and other shared vehicle types are shrinking the physical footprint needed to move people over relatively short distances. Collectively dubbed shared transport or shared mobility, these services have the potential to better connect people with public transit, reduce reliance on private cars, and make the most of existing space by "right-sizing" the vehicle, all while reducing greenhouse gas emissions.

Yet like any new entrants into a well-established system, many of these services have faced resistance, backlash, and growing pains. Shared mobility providers may desire to have their vehicles placed in highly trafficked and visible locations while governments and businesses may wish to limit the disruption caused by the use of public spaces. Accordingly, due to regulations or city layouts, one problem for micro-mobility and shared vehicle operators in general is that the shared vehicles may not be able to be parked or stored in easily accessible and visible locations. As an example, certain parking locations may be located far away from a street or sidewalk and as such the vehicle may not be easily visible to potential users and may not be easy to identify and/or find.

A shared vehicle parked in a less visible area may be used less and thus less useful in accomplishing the goals of micro-mobility. Users looking for shared vehicles tend to take the first transportation opportunity that they see on their route and generally do not spend much time looking for such vehicles if they are not easily visible. One challenge is how to reduce the friction related to the visibility of the vehicles and how to ensure those vehicles are seen as early as possible by users.

SUMMARY

In an embodiment, a method is provided for computing a pedestrian path. The method includes receiving, by a processor, a request for directions to a shared vehicle; calculating, by the processor, a plurality of pedestrian paths to a location of the shared vehicle; determining, by the processor, line-of-sight data for one or more locations on the plurality of pedestrian paths to the location of the shared vehicle; selecting, by the processor, a pedestrian path from the plurality of pedestrian paths based at least on the line-of-sight data; and providing, by the processor, the pedestrian path.

In an embodiment, a system is provided for computing a route to a shared vehicle. The system includes a geographic database, a routing processor, and a transceiver. The geographic database is configured to store a three-dimensional map. The routing processor is configured to compute, using the three-dimensional map, the route that prioritizes a shared vehicle's discoverability from a starting location to the shared vehicle. The transceiver is configured to receive routing requests and transmit computed routes.

In an embodiment, a method is provided for generating a route. The method includes reserving, by a mobile device, a shared vehicle; identifying, by the mobile device, a location of the shared vehicle; determining, by the mobile device, one or more locations from which the location of the shared vehicle is visible; computing, by the mobile device, a route that includes a waypoint including at least one of the one or more locations; and providing, by the mobile device, the route.

BRIEF DESCRIPTION OF THE DRAWINGS

Exemplary embodiments of the present invention are described herein with reference to the following drawings.

DETAILED DESCRIPTION

Figure 1:
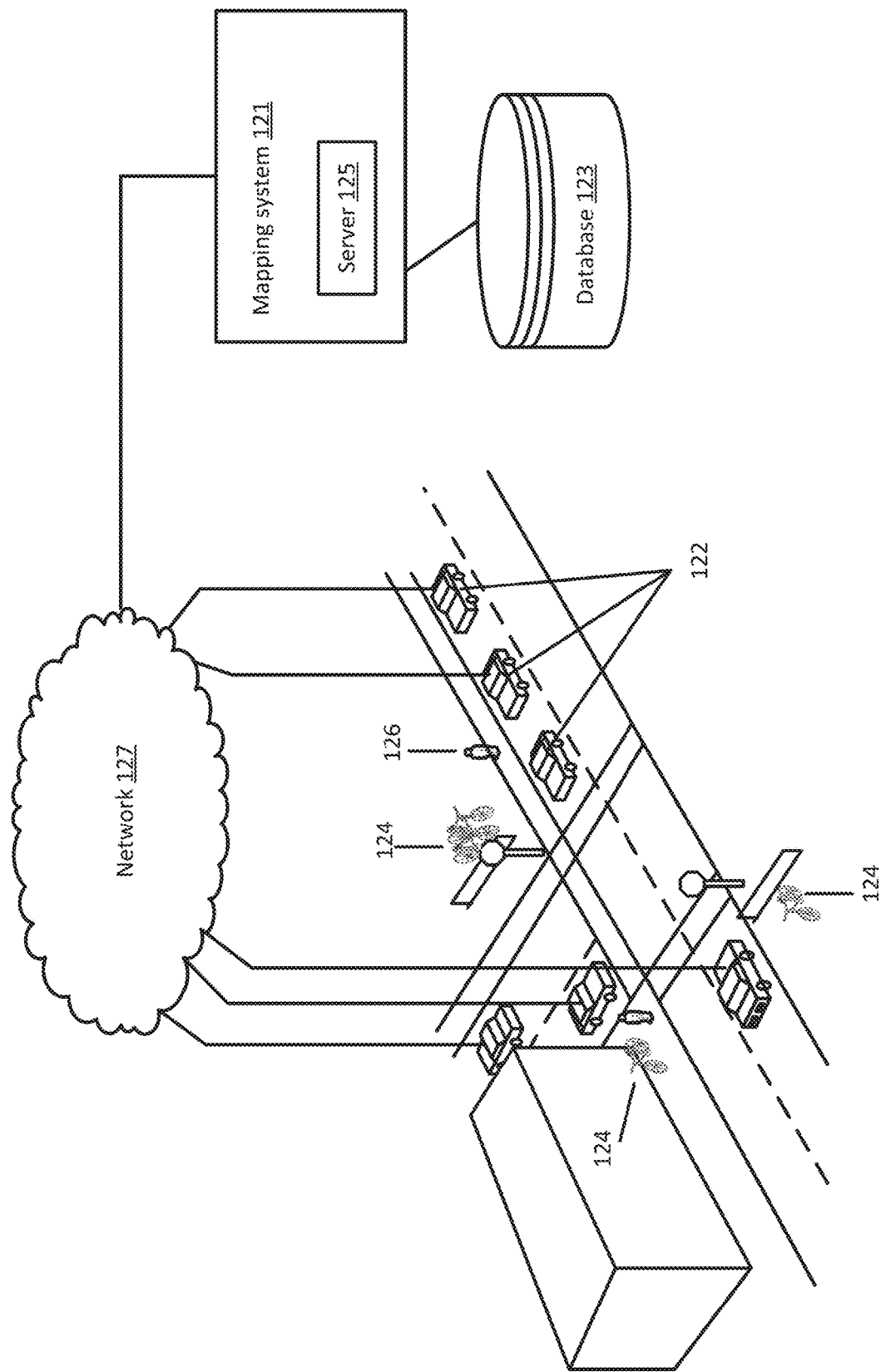
FIG. 1 depicts an example system for increasing the discoverability of a shared vehicle according to an embodiment.

Embodiments provide a system and method that reduces the uncertainty related to the availability of a shared vehicle by using a route that maximizes the visibility of the shared vehicle. Using 3D maps and other line-of-sight data, a mapping system computes a route that optimizes the shared vehicle's discoverability on the way to the respective shared vehicle. The routing may provide a compromise between a route length and line-of-sight between the shared vehicle and the user's path. In an embodiment, a route may be provided that while longer, provides the best visibility for the shared vehicle at one or more points on the route.

Optimizing the visibility of a shared vehicle may provide a better experience for users as a potential user spends less time worrying about finding the shared vehicle. In addition, by increasing the visibility of the shared vehicle earlier in a route, a user may be able to identify if the shared vehicle meets expectations. In an example, a poorly maintained shared vehicle may be identified early in the discovery process, thus allowing the user to select another shared vehicle. Adjusting or computing different routes to a shared vehicle further opens up opportunities for shared vehicle operators including advertising, other m mobility options, and increased usage.

With the emergence of shared vehicle services (e.g., shared cars, bicycles, motorcycles, boats, mopeds, scooters, etc.), the importance of providing both accessible and visible routes to shared vehicles have also increased. As used herein, the term "shared vehicle" may describe or include a car, a motorcycle, an electric bike, an electric scooter, a bicycle, a kickboard, a mini scooter, a boat, etc. owned by an individual, a commercial business, a public agency, a cooperative, or an ad hoc grouping. A shared vehicle may be human-operated, semi-autonomous, or autonomous. Sharing refers to the shared use of the vehicle between different operators. By way of example, shared vehicle services generally offer a fleet of vehicles that can be "booked" or reserved for use by users. After the user has completed their trip, the shared vehicle is checked in or returned by the user, such that a next user can use the vehicle. Certain shared vehicles may be docked, e.g., parked at specific locations using docking equipment. Other dockless shared vehicles, however, include the ability for trips to end almost anyway and thus include essentially unlimited potential parking or storage locations. Docked and dockless shared vehicles typically use location-based services in order to track both the use and parking locations of the shared vehicles.

Location-based solutions may provide a valuable service to consumers by minimizing the time a user spends attempting to check out or return a shared vehicle. A user may be able to pinpoint the location of a parked vehicle using an application based on a previously identified location that is provided when the shared vehicle ends its previous trip. However, if the shortest route is provided to a vehicle, the user may not be able to see or discover the vehicle until the very end of the route. In an example, due to restrictions, parking of shared vehicles may be placed in locations that are not easily visible from all angles or locations. A user may have to walk a block or more while looking for the vehicle without even knowing if the vehicle is in working order or is actually present at the location. Users may be frustrated by the search time without having a visible confirmation of the shared vehicle. This causes the shared vehicle service to potentially lose money and reduce the number of customers served and/or the utilization rates of the shared vehicles. Meeting expectations is also an important component in general acceptance of shared vehicles, for example micro mobility vehicles. Because trips using micro mobility vehicles are typically short, the reservation and identification process should also be short. A user that is able to visually identify a reserved vehicle from a distance may be more inclined to complete the reservation. A user that cannot see their shared vehicle may give up or select another transportation option in the intervening time.

Embodiments provide systems and methods of computing a route or path to a location of a shared vehicle (e.g., light micro-mobility vehicles, electric vehicles, micro-mobility vehicles, etc.) that optimizes or otherwise increases the discoverability of the shared vehicle using, for example line-of-sight data. Embodiments allow consumers to discover and inspect parked shared vehicles more quickly and efficiently. The line-of-sight data may be calculated based on multiple criteria such as street level imagery, satellite images, building footprints, point of interests, pedestrian flow, traffic flow, three-dimensional maps and building geometries, other visual obstacles, seasonal obstacles, or natural elements, etc. The line-of-sight data is used to identify or compute a route that optimizing the discoverability of the shared vehicle, for example by identifying and selecting waypoints that include a non-obstructed or less-obstructed view of the location of the shared vehicle.

One goal is to make the shared vehicle visible as early as possible to the user, to build the confidence that the vehicle is present, usable, and not damaged. When the user sees the shared vehicle in the street that the user has seen on a mapping app, it creates a bond between the user and shared vehicle (e.g., that is "my" shared vehicle). Until the user sees or reaches that vehicle, the user may take any other micro mobility vehicle on the way or simply walk away. User may also not have the patience to look for a few minutes for such a vehicle as this diminishes the saved time that the shared vehicle could bring to the journey and hence its overall value. Thus, there is a need for routing the user to the vehicle that considers the shared vehicle's visibility as a key element in the routing algorithm.

FIG. 1 illustrates an example system for increasing the discoverability of a shared vehicle. The system includes at least a shared vehicle 124, one or more devices 122, a network 127, and a mapping system 121. The mapping system 121 may include a database 123 (also referred to as a geographic database 123 or map database) and a server 125. A user 126 is also depicted. The user 126 may be carrying a device 122 that is configured to reserve or engage with one or more of the shared vehicles 124. Additional, different, or fewer components may be included. In an embodiment, a user reserves a shared vehicle 124 using a device 122 and requests a path or route to the shared vehicle 124. The mapping system 121 identifies one or more locations from which the shared vehicle 124 is visible and constructs a route that includes at least one of the one or more identified locations. The user, when they traverse the route, are thus provided with an earlier view of the shared vehicle 124 than would have been possible if the user took a standard route to the shared vehicle 124. When the user reaches a location from which the shared vehicle 124 is visible, the device 122 or shared vehicle 124 may provide a notification that indicates that the user should be able to observe the shared vehicle 124.

The shared vehicle 124 may be a car, a motorcycle, an electric bike, an electric scooter, a bicycle, a kickboard, a mini scooter, a boat, etc. owned by an individual, a commercial business, a public agency, a cooperative, or an ad hoc grouping. The shared vehicle 124 may be human-operated, semi-autonomous, or autonomous. Shared use of a vehicle may be referred to as shared mobility. Shared mobility may include transportation services and resources that are shared among users, either concurrently or one after another. Services such as carsharing, bike sharing, scooter sharing, on demand ride services, and ride sharing may all be included in the category of shared mobility.

Carsharing may provide a network of cars available to users for short-term use, with borrowing time generally measured in hours rather than days like traditional car rental. Carsharing is generally used for mid-to-long range trips (5 to 20+ miles), for example when shopping or other cargo is involved and a vehicle is required. A single hourly price generally includes the costs of fuel and insurance, and often parking and tolls. Pricing may reflect variable demand for vehicles over the course of the week. Rentals may be self-service, relying on apps and transponders that allow remote access to vehicles, and employ either a dedicated fleet owned and managed by the service provider or vehicles sourced from other community members (e.g., peer-to-peer carsharing). While there may be certain designated parking spots for shared cars, many times (for example with peer-to-peer carsharing) the shared vehicles 124 are dispersed at random among other parked vehicles on the roadway. Shared cars may be parked in off-street parking such as garages or parking lots and thus may include varying degrees of visibility from different locations.

Bike sharing provides shared bikes available for self-service rentals of between a few minutes to up to a day for example. Bike sharing typically includes two service configurations, docked and dockless. Hybrid configurations using both docks and free-floating bikes may also be used. Docked bikeshare is a station-based system in which users unlock bikes from a fixed dock and return them to another dock at the end of a trip. Dockless bikeshare uses location-enabled "smart bikes" with integrated locks that may be unlocked via a mobile application. Users end a ride by locking the bike anywhere within the defined operating area. Because the parking locations are essentially limitless, the visibility of dockless bikesharing has widely varying degrees of visibility. Bikes may be parked or stored in highly visible areas such as right next to a sidewalk or roadway. Bikes, however, may also be located in highly imperceptible locations such as behind trees, bushes, fences, etc. A bike parked behind a tree may be visible from one direction while hidden from another.

Scootersharing, for example, electric scooters available for short-term rental, is similar to dockless bikeshare, using the same technologies to enable service but relying on motorized scooters. Scootersharing includes the same visibility issues as dockless bike sharing as parked scooters may essentially be parked anywhere. Other types of shared vehicles 124 may be used. Shared boats, carts, planes, etc. may all have visibility issues for locating and making use of the shared vehicle 124.

Shared mobility services provide cost savings, provide convenience, and reduce vehicle usage, vehicle ownership, and vehicle miles travelled. Different types of shared mobility may be provided. For example, based on booking time frame, shared mobility services typically include on-demand (the customers can reserve vehicles in real time), reservation-based (reserved in advance), and mixed systems. In each of these scenarios, the user must find or locate the vehicle in order to use the shared vehicle 124. In one example, a user uses a shared mobility application, for example on a device 122, to reserve a shared vehicle 124. The shared mobility application identifies the location of the user and the location of potential shared vehicles 124 in the vicinity of the search area. The user selects one of the shared vehicles 124 that is then reserved for that user for a period of time. At this point, the user must find the shared vehicle 124. In another example, a user may not reserve the shared vehicle 124 through the application, but rather come across an unreserved shared vehicle 124. In both these scenarios, if/when the user finds the shared vehicle 124, the user then unlocks the shared vehicle 124, begins their trip on or in the shared vehicle 124, and arrives at the user's intended location. The user then releases (checks-in or returns) the shared vehicle 124 at the conclusion of their trip.

The shared vehicle 124 may be equipped with one or more sensors that provide information about the environment around the shared vehicle 124 such as light sensors, LIDAR, radar, cameras, etc. The shared vehicle 124 may be configured to output visual or audio queues when the shared vehicle 124 becomes visible to a potential user. In an example, when a user reaches a waypoint or location in a route where there is an unobstructed line-of-sight or view of the share vehicle 124, the shared vehicle may blink a light or emit an audio beep. In another example, the shared vehicle 124 may be configured to make itself more visible by moving, re-orienting itself, or, for example, projecting a light towards a reflective surface when the shared vehicle 124 is expected to be visible to the user.

The shared vehicle 124 may acquire data from the mapping system 121, server 125, or other devices 122. The one or more devices 122 may include devices carried by or used by potential users of the shared vehicle 124. The one or more devices 122 are configured to collect data about potential parking location and provide the data to the mapping system 121. The one or more devices 122 may also be configured to provide data about a location, a shared vehicle 124, or a shared mobility application to a user. The one or more devices 122 may include probe devices, probe sensors, or other devices 122 such as personal navigation devices 122 or connected vehicles. The mapping system 121 may communicate with the devices 122 through the network 127. The mapping system 121 may also receive data from one or more systems or services that may be used to identify the location of a vehicle or details about locations, for example the visibility of a location from different angles or other locations. The device 122 may be a navigation system built into a vehicle 124 and configured to monitor the vehicle 124. The devices 122 may also be integrated in or with a vehicle 124. The devices 122 may include mobile phones running specialized applications that collect location data as the devices 122 are carried by persons or things traveling the roadway system. The devices 122 may be configured to collect and transmit data including a location of a shared vehicle 124 or information about locations. The devices 122 may be configured to provide guidance for a user or shared vehicle 124.

The mapping system 121/server 125 is configured to calculate line-of-sight data for different locations based on information received from shared vehicles 124, devices 122, and other sources. The line-of-sight data for a location may be calculated using mapping data, for example two-dimensional, three-dimensional, or other data stored in the geographic database 123. The line-of-sight data may represent whether or not there is a clear sightline between two locations (or obstructed or partially obstructed). A sightline (also sight line), visual axis, or line-of-sight may be defined as an imaginary line between a viewer/observer/spectator's eye(s) and a subject of interest. In an embodiment, the mapping system 121 is configured to calculate visibility values for a location that describe the visibility of a particular location. Co-pending application U.S. Ser. No. 17/342, 030, incorporated in its entirety by reference, describes the calculation of a visibility value. The visibility value may be used by the mapping system 121 for determining lines of sight or sightlines.

The one or more devices 122 and/or the shared vehicle 124 may be configured to acquire the information on which the line-of-sight data is based. The one or more devices 122 may include one or more sensors configured to acquire data about the roadway or locations located in and about the roadway. These sensors may include positioning sensors, image or video sensors, ranging sensors etc. The shared vehicle 124 may include a variety of devices or sensors that collect data and information about the location and surroundings of the shared vehicle 124. Similar to the one or more devices 122, these devices/sensors may include positioning sensors, image or video sensors, ranging sensors etc.

The one or more devices 122 and/or the shared vehicle 124 may be configured to acquire positioning data to identify or monitor a location. Positioning data may be generated by a global positioning system, a dead reckoning-type system, cellular location system, or combinations of these or other systems, that may be referred to as position circuitry or a position detector. The positioning circuitry may include suitable sensing devices that measure the traveling distance, speed, direction, and so on, of a device 122 or shared vehicle 124. The positioning system may also include a receiver and correlation chip to obtain a GPS or GNSS signal. Alternatively, or additionally, the one or more detectors or sensors may include an accelerometer built or embedded into or within the interior of a vehicle that provides information to a device 122. A vehicle may include one or more distance data detection devices or sensors, such as a LiDAR or RADAR device. Radar sends out radio waves that detect objects and gauge their distance and speed in relation to the vehicle in real time. Both short- and long-range radar sensors may be deployed all around the car and each one has their different functions. While short range (24 GHz) radar applications enable blind spot monitoring, for example lane-keeping assistance, and parking aids, the roles of the long range (77 GHz) radar sensors include automatic distance control and brake assistance. Unlike camera sensors, radar systems typically have no trouble when identifying objects during fog or rain. The vehicle may also be equipped with LiDAR. LiDAR sensors work similar to radar systems, with the difference being that LiDAR uses lasers instead of radio waves. Apart from measuring the distances to various objects on the road, the vehicle may use LiDAR to create three-dimensional images of the detected objects and map the surroundings. The vehicle may use LiDAR to create a full 360-degree map around the vehicle rather than relying on a narrow field of view.

The distance data detection sensor may include a laser range finder that rotates a mirror directing a laser to the surroundings or vicinity of a collection vehicle on a roadway or another collection device on any type of pathway. Such a vehicle includes a communication device and an environment sensor array for detecting and reporting the surroundings of the vehicle to the mapping system 121 in order to, for example, generate a three-dimensional map or to identify and analyze lines of sight or obstructions that could limit visibility of a certain location. The vehicle may include an integrated communication device coupled with an in-dash navigation system. The vehicle may include an ad-hoc communication device such as a mobile device or smartphone in communication with a vehicle system. The communication device connects the vehicle to a network 127 including at least the mapping system 121.

The device 122 and/or shared vehicle 124 may also use passive sensors, such as vision-based techniques with cameras or other imaging sensors to understand its position and provide information to the mapping system 121 to compute, acquire, or analyze line-of-sight data. Vision-based techniques are used to acquire information about visibility from the street using street level imagery (SLI), line-of-sight computations, building geometries, and other visual obstacles such as seasonal obstacles and natural elements. Video data, image data, or other sensor data may be collected and processed to identify line-of-sight data. Image recognition methods or classifiers such as neural networks may be used to identify features or obstacles for an area. In an example, the device 122 may acquire image data/street level imagery about a location such as the presence or absence of a fence, hedge, wall, etc. The image data may be used by the mapping system 121 along with mapping data stored in the geographic database 123 to understand the presence or absence of clear sight lines from the location of the device 122 to a particular location. If, for example, an obstacle is between the location of the device 122 and the particular location and a potential (or actual) shared vehicle 124 cannot be seen, then the line-of-sight data may be determined to be obstructed. The image data/street level imagery may also be used to verify or as ground truth data for determining visibility and line-of-sight computations that otherwise may be performed by generating a three-dimensional map from satellite images, building geometries, or overhead images. Image data or other passive sensor data may also be used by the mapping system 121 to understand lighting or seasonal changes such as differences in line-of-sight data or sight lines between times of the day or days of the year.

Information about location acquired from devices 122, shared vehicles 124, and/or other sources is stored in a geographic database 123. The geographic database 123 includes information about one or more geographic regions. The HD map and the geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout the geographic region to observe features and/or record information about the roadway. Remote sensing, such as aerial or satellite photography, may be used. The database 123 is connected to the server 125. The geographic database 123 and the data stored within the geographic database 123 may be licensed or delivered on-demand. Other navigational services or traffic server providers may access the traffic data stored in the geographic database 123. Data for an object or point of interest may be broadcast as a service.

Figure 2:
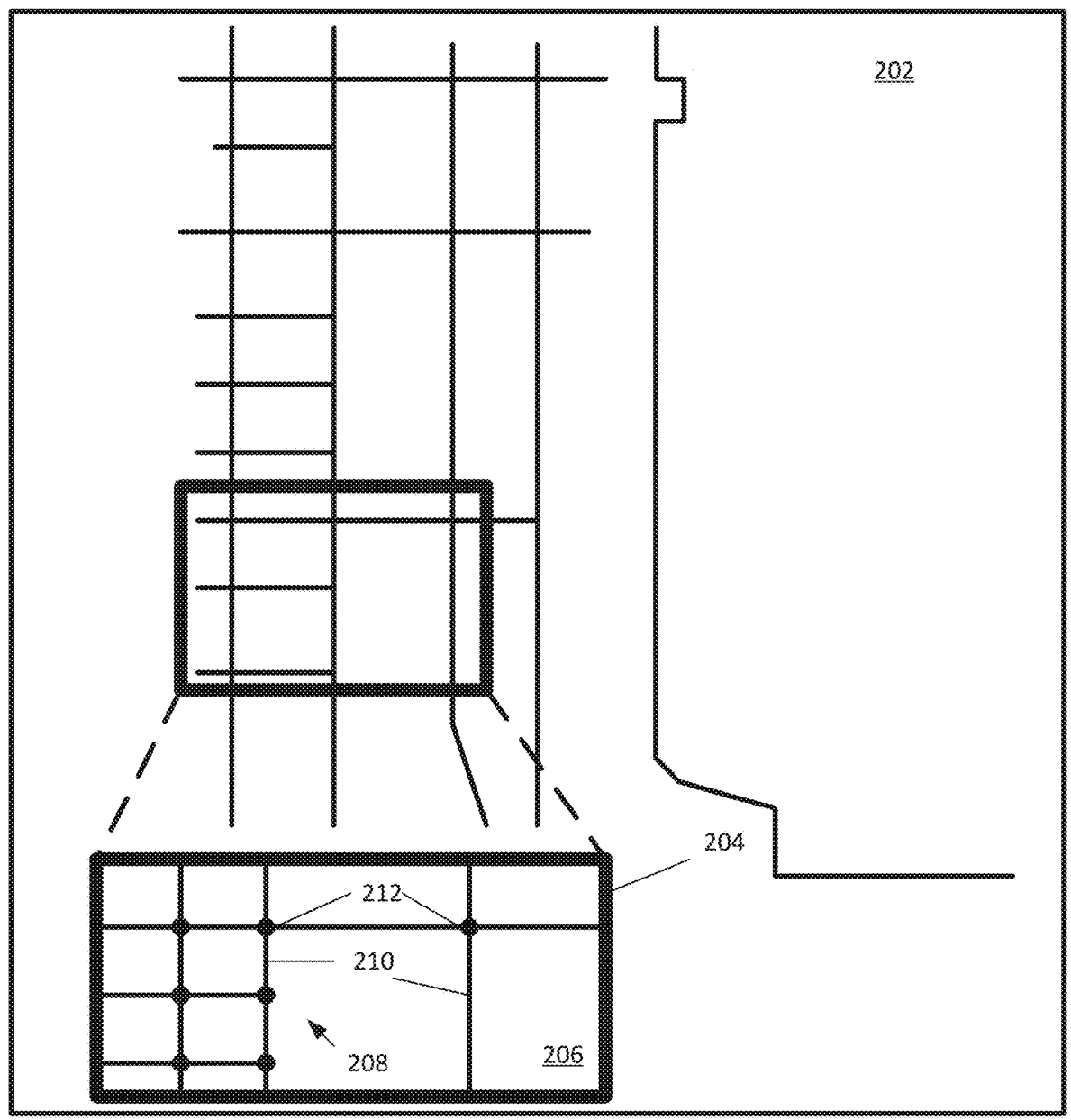
FIG. 2 depicts an example region of a geographic database.

FIG. 2 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 2 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Road segments 210 may also be referred to as links. Each road segment 210 is shown to have associated with it one or more nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 3:
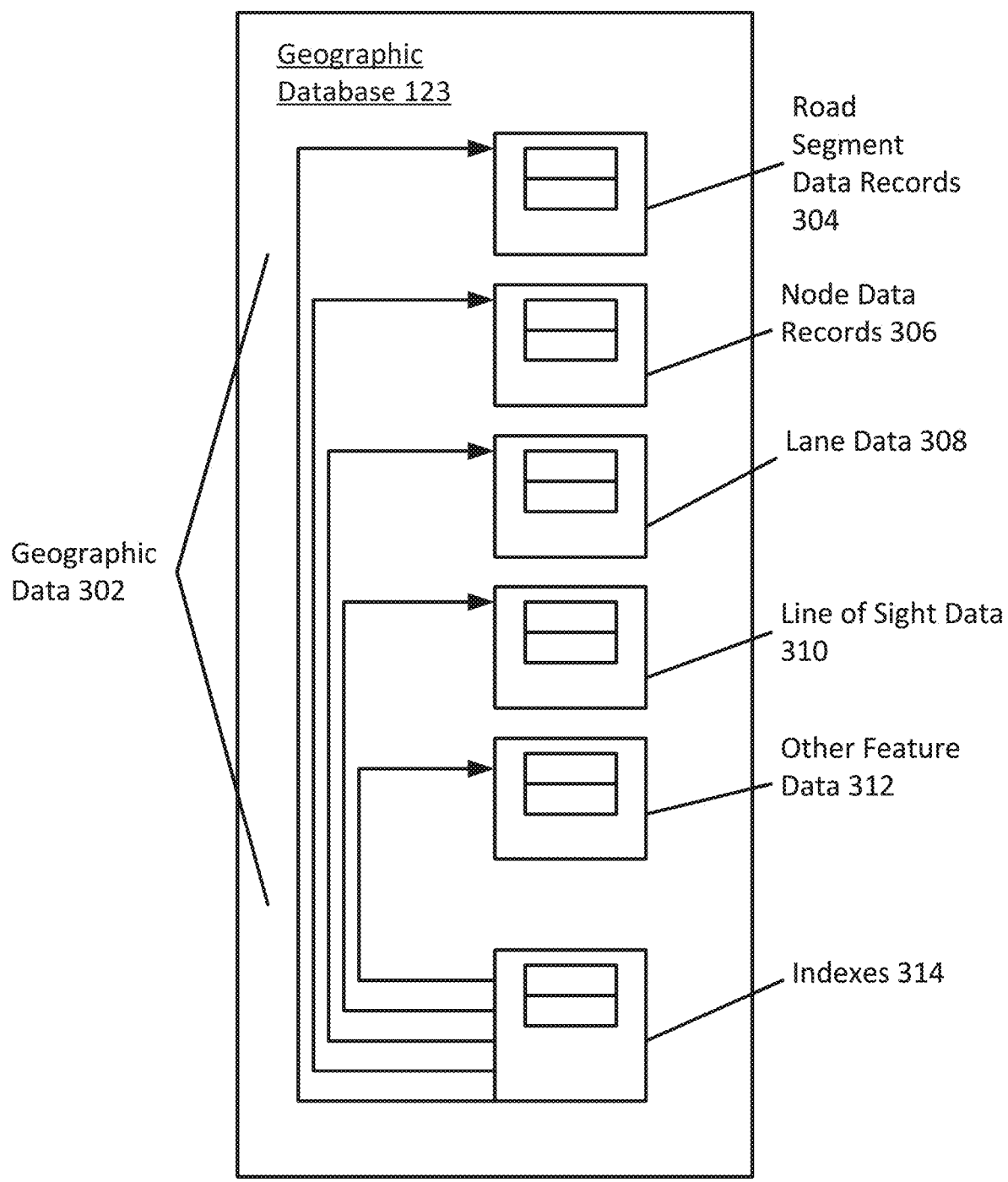
FIG. 3 depicts an example geographic database of FIG. 2.

As depicted in FIG. 3, in one embodiment, the geographic database 123 contains geographic data 302 that represents some of the geographic features in the geographic region 202 depicted in FIG. 2. The data 302 contained in the geographic database 123 may include data that represent the road network 208 and/or regions in and around the roadway network 208. In FIG. 3, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include feature data 308-312. The feature data 312 may represent types of geographic features. For example, the feature data may include roadway data 308 including signage data, lane data, traffic signal data, physical and painted features like dividers, lane divider markings, road edges, center of intersection, stop bars, overpasses, overhead bridges etc. The roadway data 308 may be further stored in sub-indices that account for different types of roads or features. The point of interest data may include data or sub-indices or layers for different types points of interest. The point of interest data may include point of interest records comprising a type (e.g., the type of point of interest, such as restaurant, fuel station, hotel, city hall, police station, historical marker, ATM, golf course, truck stop, vehicle chain-up stations etc.), location of the point of interest, a phone number, hours of operation, etc. The feature data 312 may include other roadway features. The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

In an embodiment, the line-of-sight data 310 is stored in the geographic database 123. The line-of-sight data 310 stores sight lines or location data for where possible parking or storage locations for shared vehicles 124 are visible from other locations. The line-of-sight data 310 may be derived from three-dimensional mapping data stored elsewhere in the geographic database 123.

Figure 4:
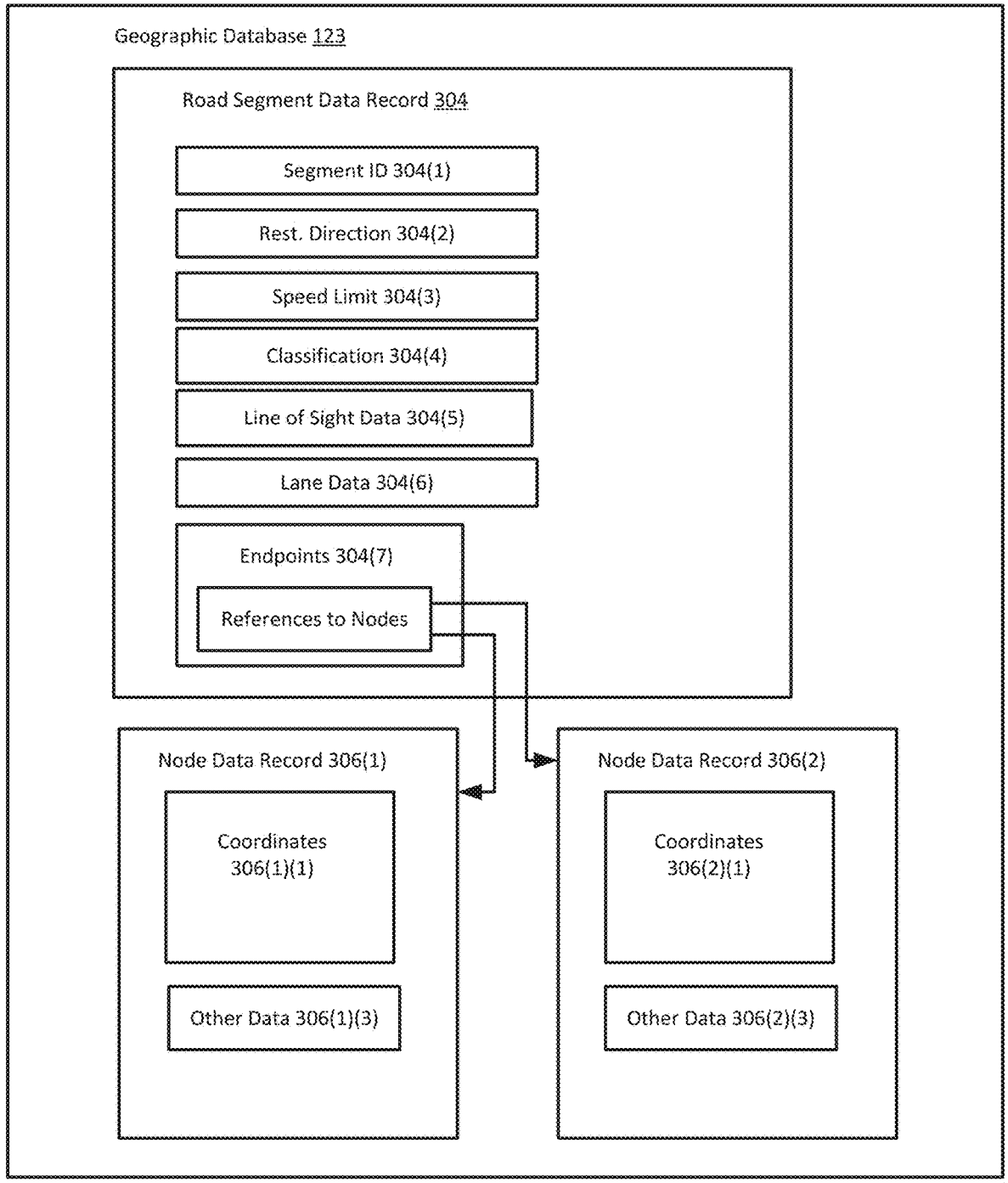
FIG. 4 depicts an example structure of the geographic database.

FIG. 4 shows some of the components of a road segment data record 304 contained in the geographic database 123 according to one embodiment. The road segment data record 304 may include a segment ID 304(1) by which the data record may be identified in the geographic database 123. Each road segment data record 304 may have associated with the data record, information such as "attributes", "fields", etc. that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include data 304(4) indicating whether the represented road segment is part of a controlled access road (such as an expressway), a ramp to a controlled access road, a bridge, a tunnel, a toll road, a ferry, and so on. The road segment data record 304 may include data 304(5) related to points of interest. The road segment data record 304 may include data 304(6) that describes roadway data. The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment. The road segment data record 304 may also include or be associated with other data 304(7) that refer to various other attributes of the represented road segment such as coordinate data for shape points, POIs, signage, other parts of the road segment, among others. The various attributes associated with a road segment may be included in a single road segment record or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is known, the street address ranges along the represented road segment, and so on.

FIG. 4 also shows some of the components of a node data record 306 which may be contained in the geographic database 123. Each of the node data records 306 may have associated information (such as "attributes", "fields", etc.) that allows identification of the road segment(s) that connect to it and/or a geographic position (e.g., latitude and longitude coordinates). For the embodiment shown in FIG. 4, the node data records 306(1) and 306(2) include the latitude and longitude coordinates 306(1)(1) and 306(2)(1) for their node. The node data records 306(1) and 306(2) may also include other data 306(1)(3) and 306(2)(3) that refer to various other attributes of the nodes.

The data in in the geographic database 123 may also be organized using a graph that specifies relationships between entities. A Location Graph is a graph that includes relationships between location objects in a variety of ways. Objects and their relationships may be described using a set of labels. Objects may be referred to as "nodes" of the Location Graph, where the nodes and relationships among nodes may have data attributes. The organization of the Location Graph may be defined by a data scheme that defines the structure of the data. The organization of the nodes and relationships may be stored in an Ontology which defines a set of concepts where the focus is on the meaning and shared understanding. These descriptions permit mapping of concepts from one domain to another. The Ontology is modeled in a formal knowledge representation language which supports inferencing and is readily available from both open-source and proprietary tools.

The mapping system 121 and devices 122 are connected to the network 127. The shared vehicles 124 may also be connected to the mapping system 121 or devices 122 through the network 127. The devices 122, shared vehicles 124, and/or mapping system 121 may receive or transmit data through the network 127. The mapping system 121 may also transmit paths, routes, or feature data through the network 127, for example using a transceiver. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMAX (Worldwide Interoperability for Microwave Access) network, DSRC (otherwise known as WAVE, ITS-G5, or 802.11p and future generations thereof), a 5G wireless network, or wireless short-range network. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols.

The mapping system 121 may include multiple servers 125, workstations, databases, and other machines connected together and maintained by a map developer. The mapping system 121 and/or server may include one or more processors configured to execute instructions such as detailed in the methods described below. A server 125 may be a host for a website or web service such as a mapping service and/or a navigation service. The mapping service may provide maps generated from the geographic data of the database 123, and the navigation service may generate routing or other directions from the geographic data of the database 123. The mapping service may also provide information generated from data included in the database 123. The server 125 may also provide historical, future, recent or current traffic conditions for the road segments, segments, paths, or routes using historical, recent, or real time collected data. The server 125 may include one or more processors, for example a routing processor that is configured to implement a routing algorithm. The server 125 and/or mapping system 121 may provide or be used by a shared services application that provides access to shared vehicles 124.

The mapping system 121/server 125 is configured to calculate line-of-sight data for different locations to a location where a shared vehicle 124 may be parked or stored. The mapping system 121 is configured to store the line-of-sight data in the geographic database 123 and/or otherwise make the line-of-sight data accessible to user or applications that relate to shared vehicles 124. The mapping system 121 may be configured to update and adjust the line-of-sight data over time as data is collected and processed. The line-of-sight data may be dynamic and may depend on weather, lighting, seasonal obstacles, etc. The mapping system 121 is configured to acquire data that affects the line-of-sight data and make adjustments or updates when required. The mapping system 121 is configured to use the line-of-sight data to generate or select waypoints in a route from a user to a shared vehicle 124. The mapping system 121 uses a routing algorithm to compromise between generating a direct route with generating a route that maximizes the visibility of a shared vehicle 124.

In an example operation, the mapping system 121 receives a request for directions to a shared vehicle. The request may include a starting location (e.g., a location of a device of a user 126) and a destination (e.g., a location of a shared vehicle 124). The request may be generated by an application, a mobility provider, or the user 126 for example. The mapping system 121 computes or identifies line-of-sight data for locations along possible routes to the destination. A routing algorithm in the mapping system 121 selects a route that attempts to maximize visibility of the destination to the user 126 as they traverse the route while still taking into account other factors such as the route distance. In an example, if two potential different routes are otherwise equal in length, the mapping system 121 will select the route of the two that provides the best visibility of the location of the shared vehicle 124.

Figure 5:
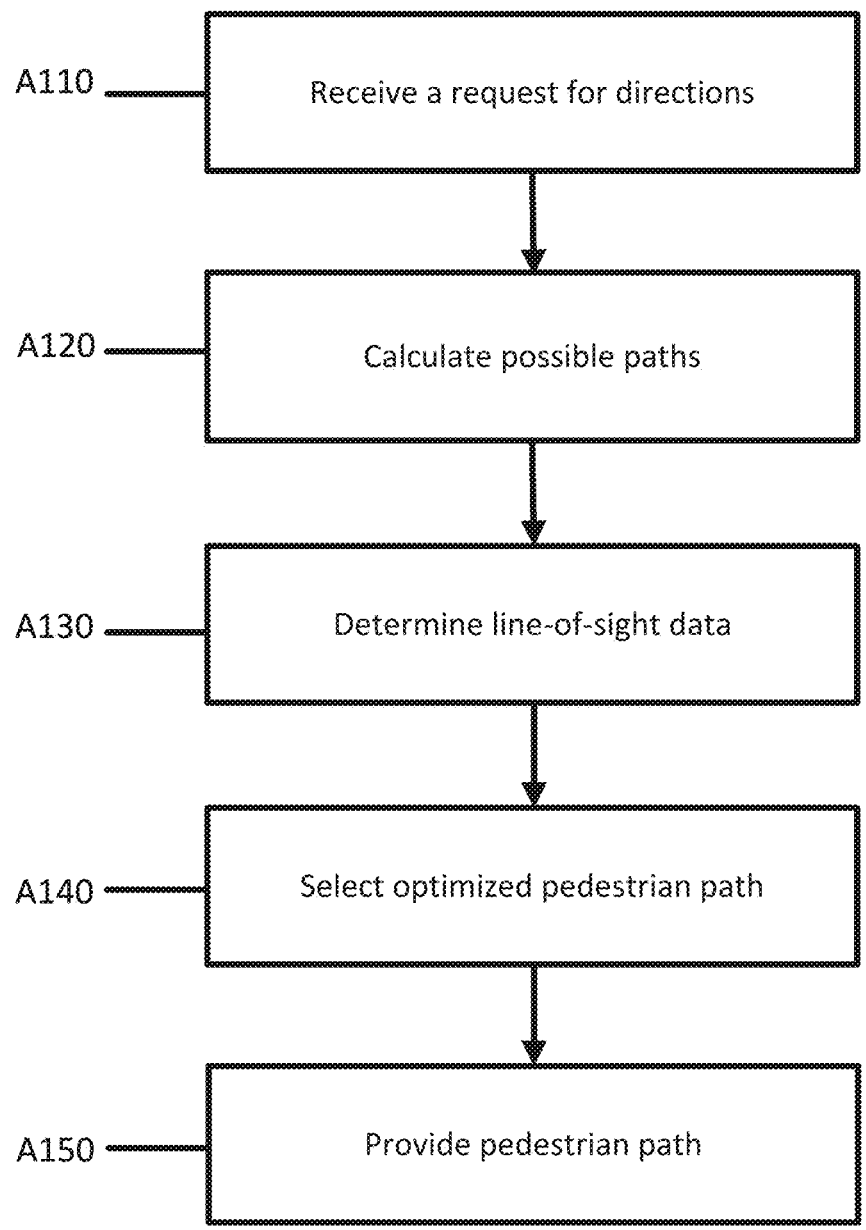
FIG. 5 depicts an example workflow for increasing the discoverability of a shared vehicle according to an embodiment.

FIG. 5 illustrates an example flow chart for increasing the discoverability of a shared vehicle 124. As presented in the following sections, the acts may be performed using any combination of the components indicated in FIGS. 1, 10, and 12. The following acts may be performed by the server 125, the device 122, the shared vehicle 124, the mapping system 121, or a combination thereof. Additional, different, or fewer acts may be provided. The acts are performed in the order shown or other orders. The acts may also be repeated. Certain acts may be skipped.

At act A110, the mapping system 121 receives a request for directions to a shared vehicle 124. The request includes a staring point (origin) and an ending point (destination). The request may include preferences, for example priorities for the user. A user may desire to take the safest route, the shortest route, etc. In the examples provided below, a pedestrian path is request, but the directions may be provided for any type of transportation. The request may be received from a device 122 or a shared mobility application.

At act A120, the mapping system 121 identifies a plurality of routes to a location of the shared vehicle 124. Different routes may be generated that prioritize different features or aspects. There may be multiple different possible routes to the destination depending on the layout of the roadway/sidewalks.

Figure 6:
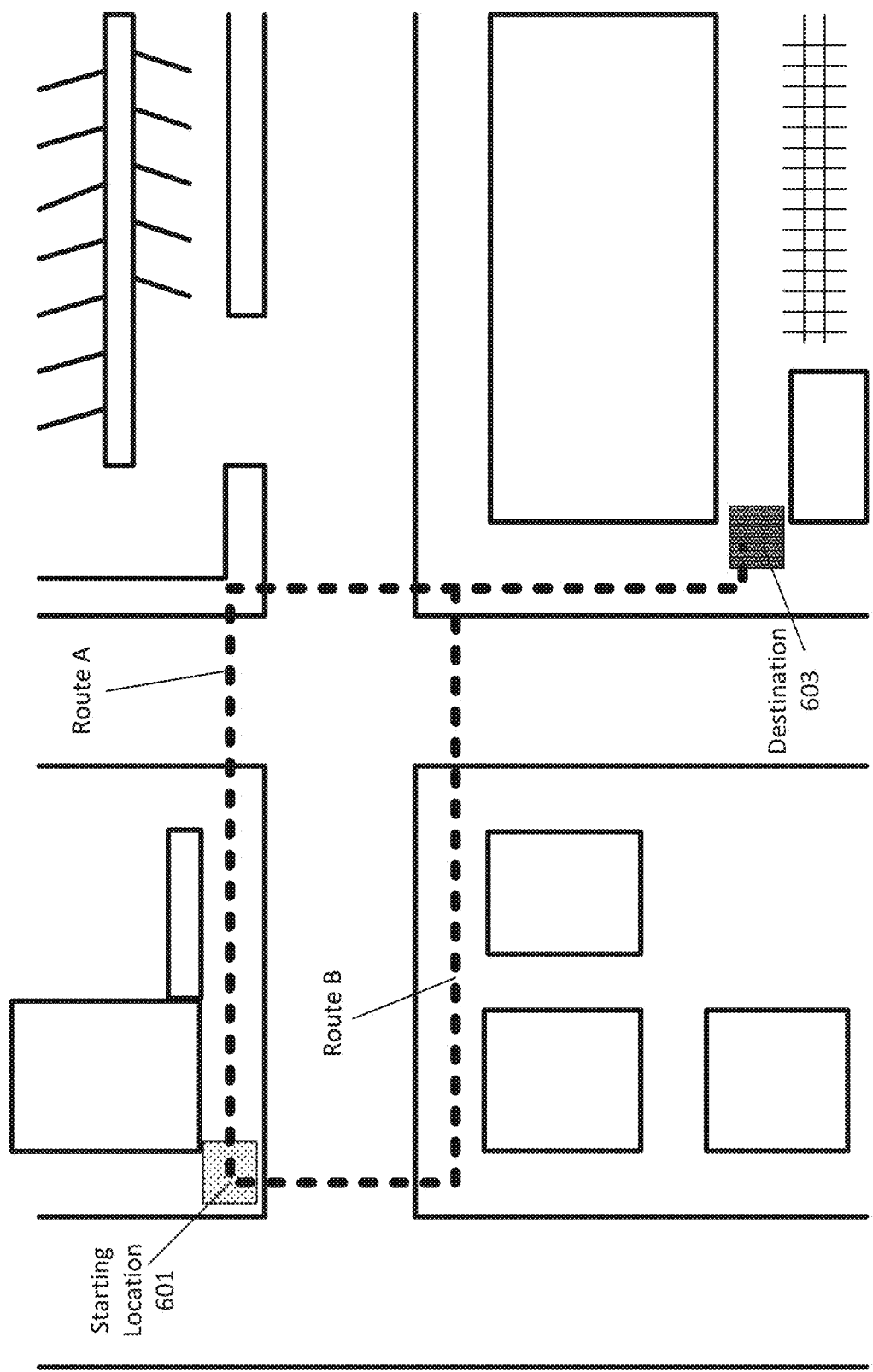
FIG. 6 depicts an example region with two routes from a starting location to a destination.

FIG. 6 depicts an example of two different routes or pedestrian paths from the starting point to the destination. For the sake of brevity, there are only two routes depicted, but there may be tens or hundreds or thousands of potential routes depending on the distance and layout of the roadway. In FIG. 6, there is a starting location 601 and a destination 603. The starting location 601 may be the location of the device 122 or user requesting directions. The destination 603 may be the location of the shared vehicle 124 that was selected or reserved by the device 122, application, or user. There are two routes, route A and route B depicted in FIG. 6. Route A stays on the sidewalk, crosses a first street, crosses a second street, and then heads straight to the destination 603. Route B immediately crosses the second street, follows the sidewalk, then crosses the first street, takes a right on the sidewalk, and ends at the destination 603. For this example, Route A and Route B are the same distance and may, for example, take the same amount of time to traverse.

At act A130, the mapping system 121 determines line-of-sight data for locations on the plurality of pedestrian paths to the location of the shared vehicle. The line-of-sight data may include a determination of whether or not a person at a respective location has a clear or partially unobstructed view of the location of the shared vehicle 124. The line-of-sight data may be dynamic and may depend on the weather, temporary obstacles, lighting, or other temporary obstructions. The line-of-sight data may also take into account a height or orientation of the shared vehicle 124.

Figure 7:
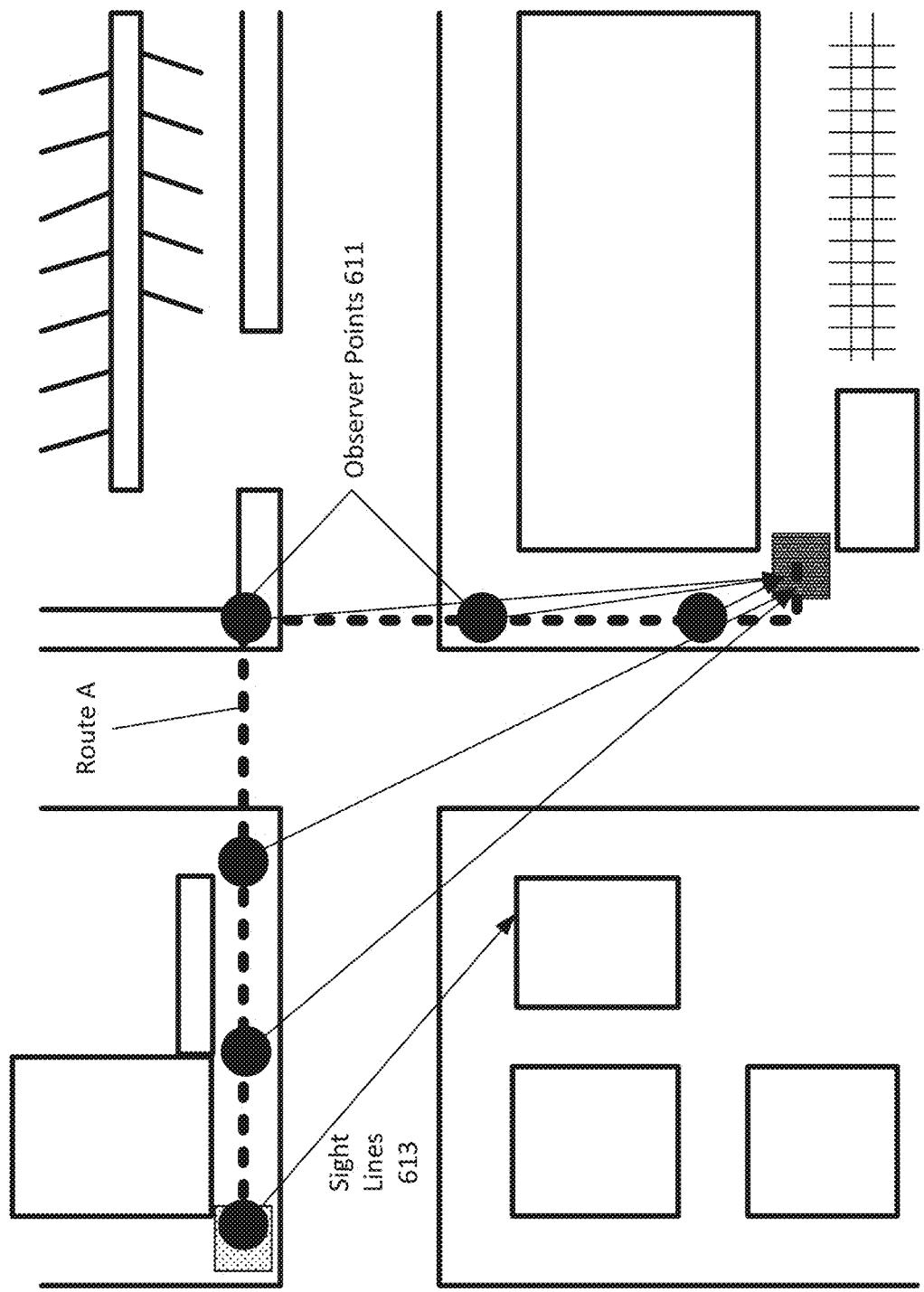
FIG. 7 depicts example site lines for one route depicted in FIG. 6.
Figure 8:
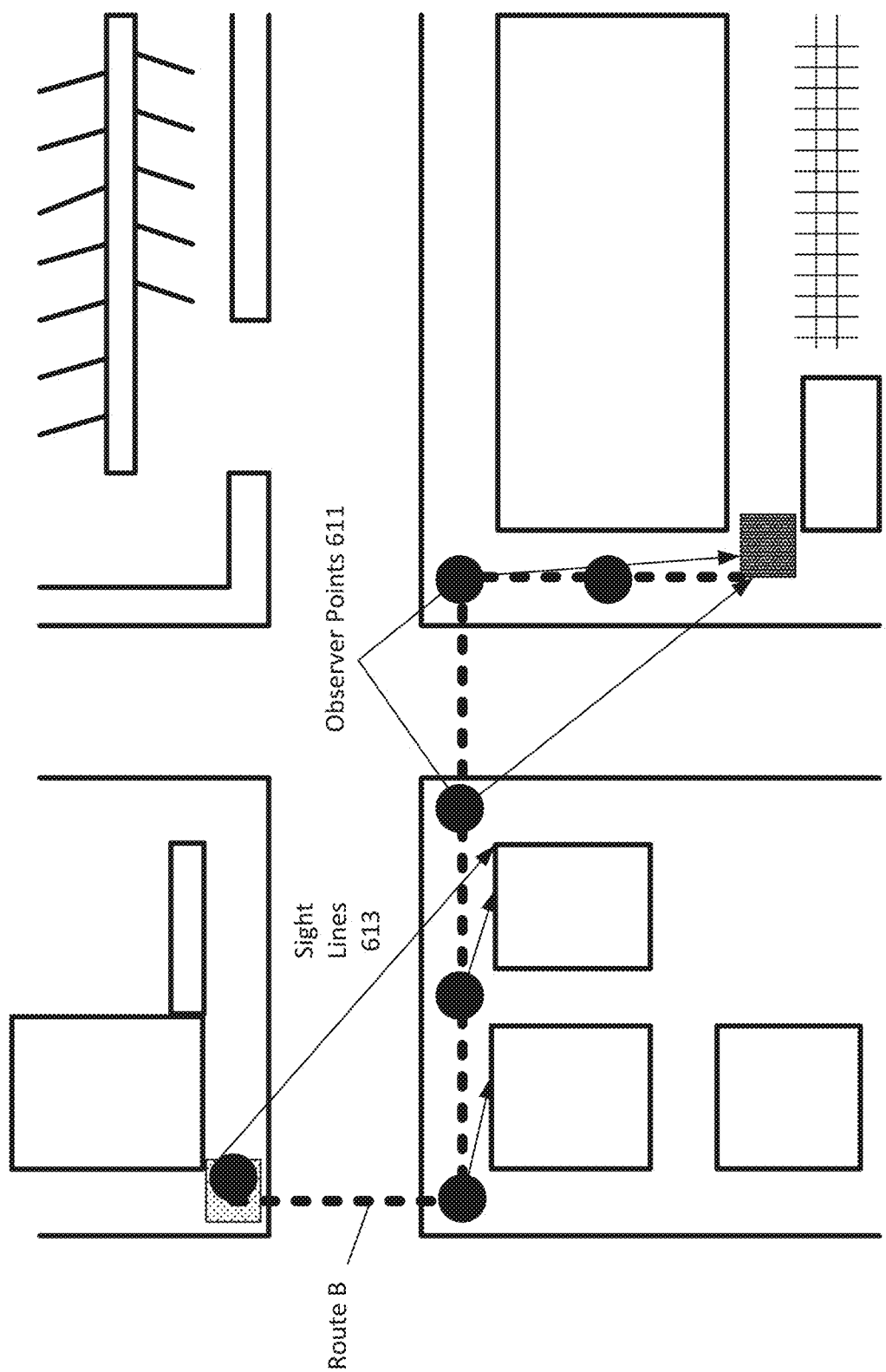
FIG. 8 depicts example site lines for one route depicted in FIG. 6.

FIGS. 7 and 8 depicts several different representations of line-of-sights for the routes A and B of FIG. 6. FIG. 7 depicts several sight lines 613 for observer points 611 for route A. An observer point 611 is a location for which the mapping system 121 selects to check if there is a sightline 613 to the location/destination 603 of the shared vehicle 124. The observer points 611 may be randomly selected, selected at set distances, or continuous along the route. In FIG. 7, there are six depicted observer points 611. There may be fewer or more observer points 611 depending on the route. The mapping system 121 determines for each of the observer points 611 whether or not the destination 603 (and therefore the shared vehicle 124) is visible. In FIG. 7, the observer point 611 at the starting location 601 cannot see the destination 603 and thus the shared vehicle 124 is not visible from this location. However, if the user traversed the route, the user would be able to see the shared vehicle 124 (or at least the destination 603) from the remaining five observer points 611. Route A, in other words, provides a very visible route to the shared vehicle 124. The user would be able to see or discover the shared vehicle 124 at a very early point. This allows the user to make sure the shared vehicle 124 is where it should be (e.g., present) and is in working condition. FIG. 8 depicts several sight lines 613 for observer points 611 for route B. Again, the user cannot see the destination 603 from the starting location 601. By crossing the street, the route also limits the ability of the user to see the shared vehicle 124 until the user reaches the corner of the two streets. In other words, the user would not be able to see the shared vehicle 124 until about halfway through the route.

The line-of-sight data or sight lines may be calculated from, for example, visibility from the street using street level imagery (SLI), computations based on two-dimensional or three-dimensional map data, satellite images, building footprints, locations of POIs, pedestrian or traffic flow, building geometries, obstacles data such as seasonal obstacles/natural elements, designated parking areas (indoor and outdoor), lighting, etc. Mapping data may be acquired by devices 122 or other sensors in the area and stored in the geographic database 123. Street level imagery may be captured by probe vehicles as the probe vehicles traverse the roadway. The street level imagery may be stitched together to form a continuous view from the street. The street level imagery may provide one or more sight lines for determining the line-of-sight data. The street level imagery may be used to identify certain objects or features such as hedges, fences, trees, bushes, or other obstacles that would block visibility of the location of the shared vehicle 124 from the observer points.

The line-of-sight data may be dynamic, e.g., changing over time depending on certain conditions. Weather, for example, may limit visibility. Seasonal obstacles such as trees or plants may limit or increase visibility depending on the time of year. Lighting may also be an important factor. At night, even though a location may provide a clear line-of-sight to the location of the shared vehicle 124, the lack of lighting may mean that the shared vehicle is not visible. Other temporary obstacles such as trucks, signage, benches, events, etc. may limit visibility from certain locations.

A three-dimensional map may be generated or otherwise accessed by the mapping system 121. The three-dimensional map provides information about obstacles and objects that may limit visibility of a potential location from different viewpoints of a potential customer as they traverse a route or path. The three-dimensional map may be generated by using recorded measurements such as the size and footprint of a building or wall. The three-dimensional may also be generated by capturing data about a location using, for example, LIDAR or camera-based systems. Three-dimensional maps may also be generated from overhead imagery or other data. In certain situations, a two-dimensional map may be used in place or along with the three-dimensional map. The two-dimensional map of FIG. 6, for example, may quickly provide information to a user but may lack certain feature data such as a height of a building, wall, hedge, etc. A crude three-dimensional map, however, may be generated by using a two-dimensional map and stored height measurements.

Figure 9:
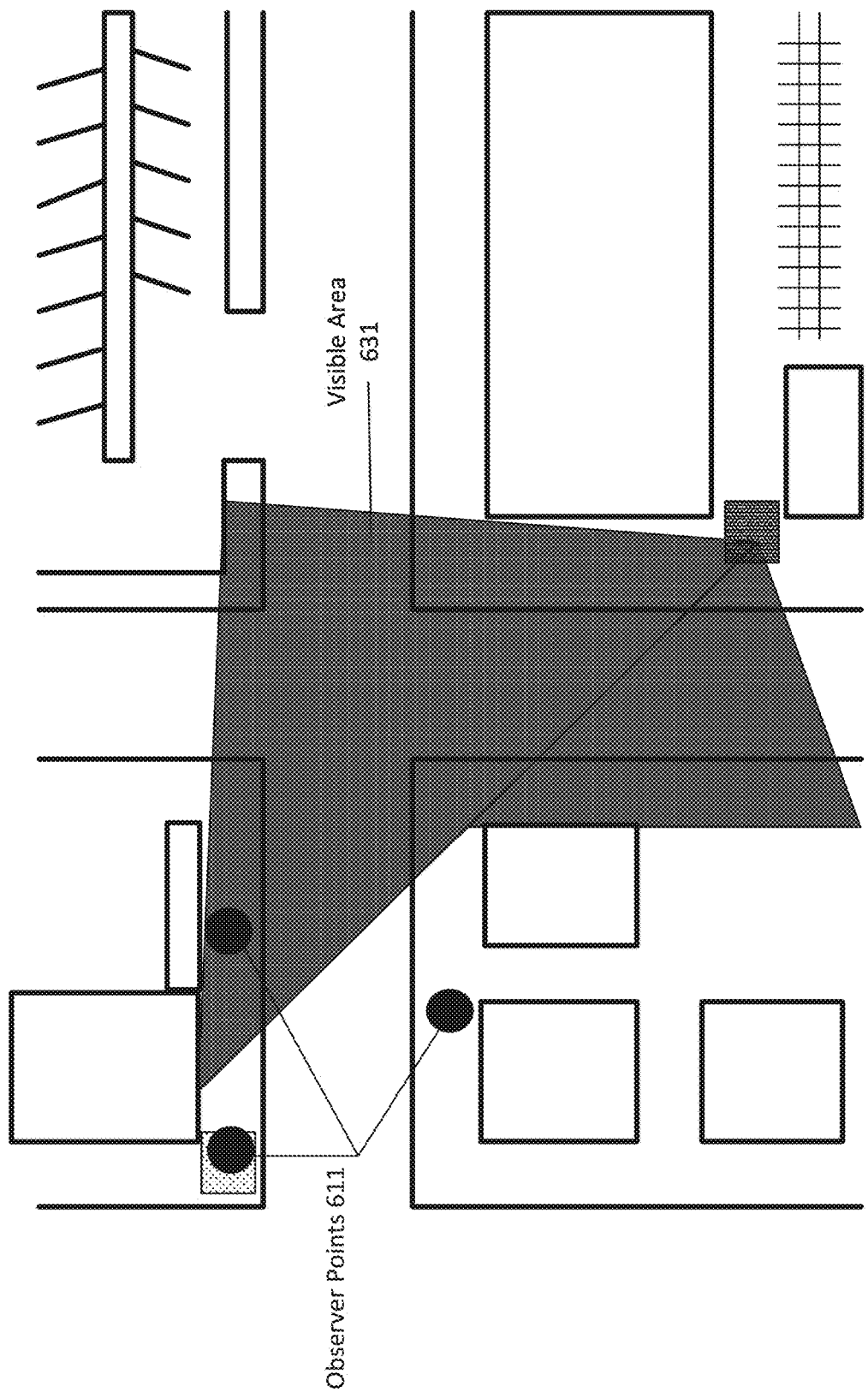
FIG. 9 depicts an example visible area for the destination of FIG. 6.

In an embodiment, the shared vehicle 124 may play an active role in determining its visibility by capturing information about nearby elements or objects that are likely to affect its visibility at a particular location. The shared vehicle 124 may use onboard sensors like cameras, proximity sensors, LIDAR, etc. to identify locations from which the shared vehicle 124 is visible. FIG. 9 depicts an example of the areas 631 that are visible from the shared vehicle 124. Instead of calculating sight lines from locations on the potential paths, the routing algorithm identified locations from which the shared vehicle 124 is visible and attempts to include those locations in the provided route. In FIG. 9, there are two observer points 611 that are not in the visible area and one that is. The routing algorithm may attempt to include the observer point 611 that is in the visible area 631 in the route. In an embodiment the routing algorithm may attempt to keep as much of the route in the visible area as possible in order for the user to continuously maintain visual contact with the shared vehicle 124.

The shared vehicle 124 may identify its location and acquire proximity data about its nearby surroundings. The shared vehicle 124 may, for example, capture image or lighting data. The data is transmitted to the mapping system 121 for use in calculating sight lines for the identified location. In an embodiment, the characteristics of a shared vehicle 124 may be taken into account when calculating the sight lines or line-of-sight data. For example, the size, volume, height, brightness, color, lighting, etc. of a shared vehicle 124 may provide more or less visibility from different locations along the route. In an example, a shared vehicle 124 may be able to identify its orientation and provide this information to the mapping system 121. Different orientations of the shared vehicle 124 may limit its visibility. For example, certain shared vehicles 124 possess different profiles depending on which way they are turned. A shared bicycle may be much easier to spot from a side profile than head on. Similarly, a shared scooter or bicycle that is lying on its side may be much harder to see than if set upright. Shared vehicles 124 may include sensors that allow the shared vehicle 124 to understand its orientation. Shared vehicles 124 may also be equipped with sensors that capture images or other data about the surrounding areas and sight lines.

At act A140, the mapping system 121 computes an optimized pedestrian path from the plurality of pedestrian paths based at least on the line-of-sight data. In an example of the two routes from FIG. 6, the mapping system 121 may select route A as route A provides more visibility of the shared vehicle 124 than Route B. As described in FIGS. 7 and 8, the shared vehicle is visible earlier and more often in Route A. The shared vehicle may thus be more discoverable if the user takes route A than route B. A routing algorithm may take into account several factors when calculating an optimized route/pedestrian path. For example, the routing algorithm may attempt to limit street crossings or busy intersections. The routing algorithm may also attempt to limit the distance or time it takes to go from the starting location to the destination. The routing algorithm may weigh these different factors when calculating the route. A more visible route may be more important in certain situations than a few seconds or minutes delay. A safer route may be more important than a slight increase in visibility, etc. In the example routes of FIG. 6, the routes were the same distance and expected travel time and thus as one route clearly offered a more visible path, it would be route selected by the mapping system 121.

In an embodiment, the routing algorithm optimizing the visibility of Shared vehicles of one specific operator. If, for example, an operator maintains several shared vehicles in the area, one feature that may be used by the routing algorithm is the visibility or discoverability of these other shared vehicles. For example, a user may select a docked shared vehicle. Other dock less shared vehicles may be closer or more profitable for the operator. The routing algorithm may route the user near these other vehicles (or locations from which they are visible) in order to tempt or provide options for the user. The routing algorithm may also be used to provide a route that makes certain locations (such as business partners of the shared vehicle operator) more visible.

At act A150, the mapping system 121 provides the optimized pedestrian path. At one or more locations on the optimized pedestrian path, the device 122 or shared vehicle 124 may be configured to generate a notification, for example that the shared vehicle 124 should be visible. The mapping system 121 may also take action to increase the visibility or improve the location of a shared vehicle 124 based on the generated pedestrian paths and the optimized pedestrian path. An operator may remotely influence the visibility of a shared vehicle 124 by removing hidden elements, when possible, for example other shared vehicles 124 or objects or increasing an intensity of the lights available on the shared vehicles 124 to make them more visible at specific times of the day. In an embodiment, the shared vehicles 124 influence their visibility to place themselves in the line-of-sight of users. An operator that is able to remotely control a shared vehicle 124 may also remotely move the shared vehicle 124 to a different position that has better sight lines from more potential locations along different pedestrian paths. In an embodiment, the mapping system 121 may identify and contact an owner of an obstacle (for example a truck, dumpster, vehicle etc.) and request that the owner move the obstacle. The mapping system 121 may also distinguish between temporary obstacles and more permanent obstacles. For example, if a truck is parked in the way that obscures the location of a shared vehicle 124, the mapping system 121 may forgo contact with the truck owner or performing an operation to move the shared vehicle 124 as the obstacle is temporary (and/or contact the owner or responsible party for the obstacle to determine the length of time that the obstacle is expected to be present). If a truck is parked at a location long term or if, for example, construction work has started that will extend for days, weeks, months, the mapping system 121 may take action to improve the visibility of the location or the shared vehicle 124.

In an embodiment, a user desires to take a trip using a share vehicle 124. The user opens up a shared mobility application on a device 122 and selects a mode of transportation. The shared mobility application provides several options for the user taking into account types of vehicles. The user selects a shared vehicle 124 and requests directions to the shared vehicle 124. The mapping system 121 provides an optimized route that allows the user to discover the shared vehicle 124 as soon as possible along the route. At a first location from which the shared vehicle 124 is visible on the route, the shared mobility application or shared vehicle 124 may provide a notification. When found, the shared mobility application may request feedback from the user on how hard it was to find the shared vehicle 124.

Figure 10:
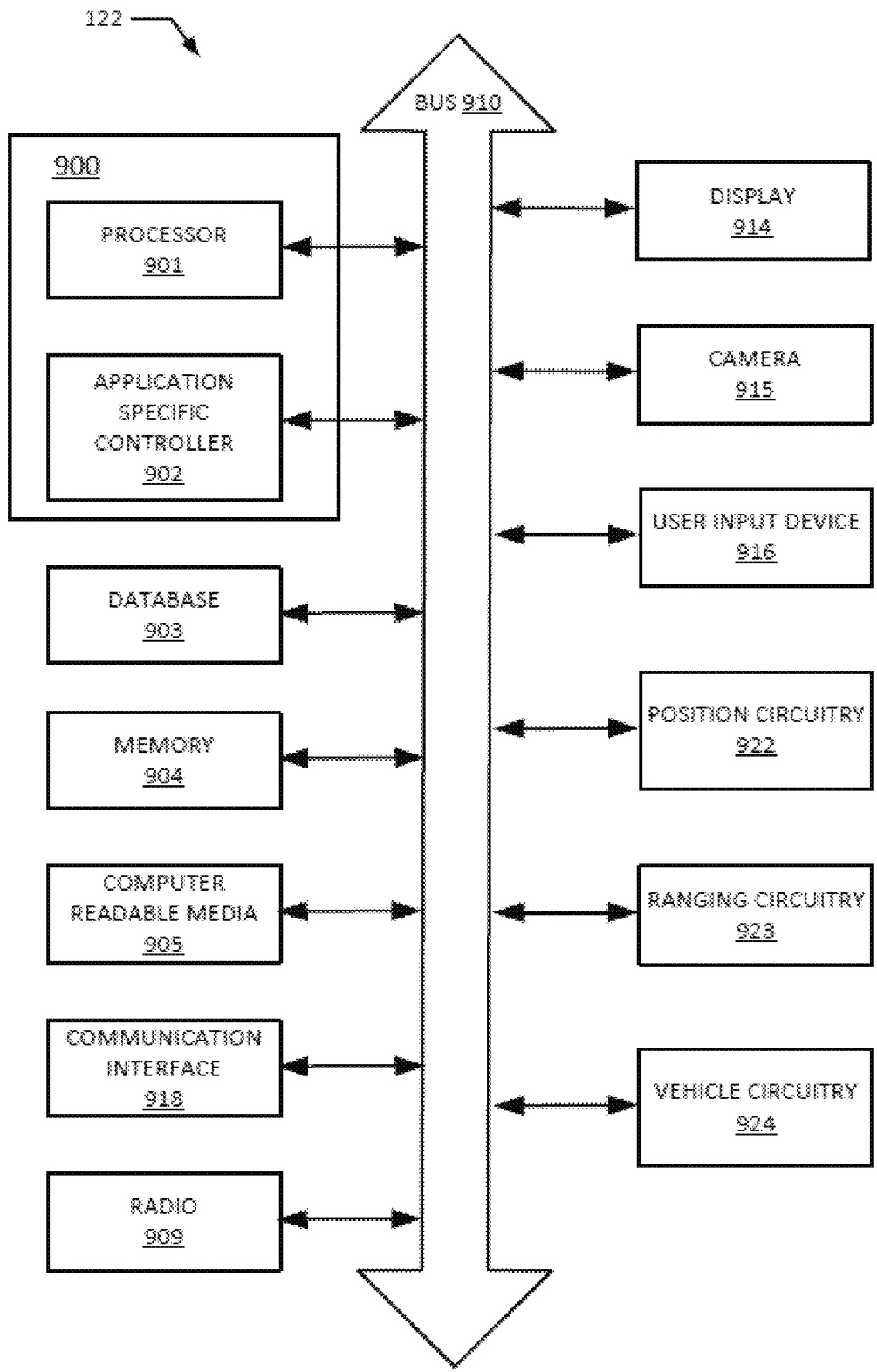
FIG. 10 depicts an example device of FIG. 1.

FIG. 10 illustrates an example mobile device 122 for the system of FIG. 1 carried by or otherwise accompanying a pedestrian that is configured to provide a route that prioritizes the discoverability of a shared vehicle 124. In an embodiment, a user makes a request to reserve the shared vehicle 124 through an application on the device 122. A routing application, for example at the device 122 or on the mapping system 121 computes a route that optimizes the vehicle's discoverability on the way to the shared vehicle 124. The routing algorithm finds the best compromise between the route length and the line-of-sight between the vehicle and the user's path.

The mobile device 122 may include a bus 910 that facilitates communication between a controller 900 that may be implemented by a processor 901 and/or an application specific controller 902, that may be referred to individually or collectively as controller 900, and one or more other components including a database 903, a memory 904, a computer readable medium 905, a communication interface 918, a radio 909, a display 914, a camera 915, a user input device 916, position circuitry 922, and ranging circuitry 923. The contents of the database 903 are described with respect to the geographic database 123. The device-side database 903 may be a user database that receives data in portions from the database 903 of the mobile device 122. The communication interface 918 connected to the internet and/ or other networks (e.g., network 127 shown in FIG. 1). Additional, different, or fewer components may be included.

Figure 11:
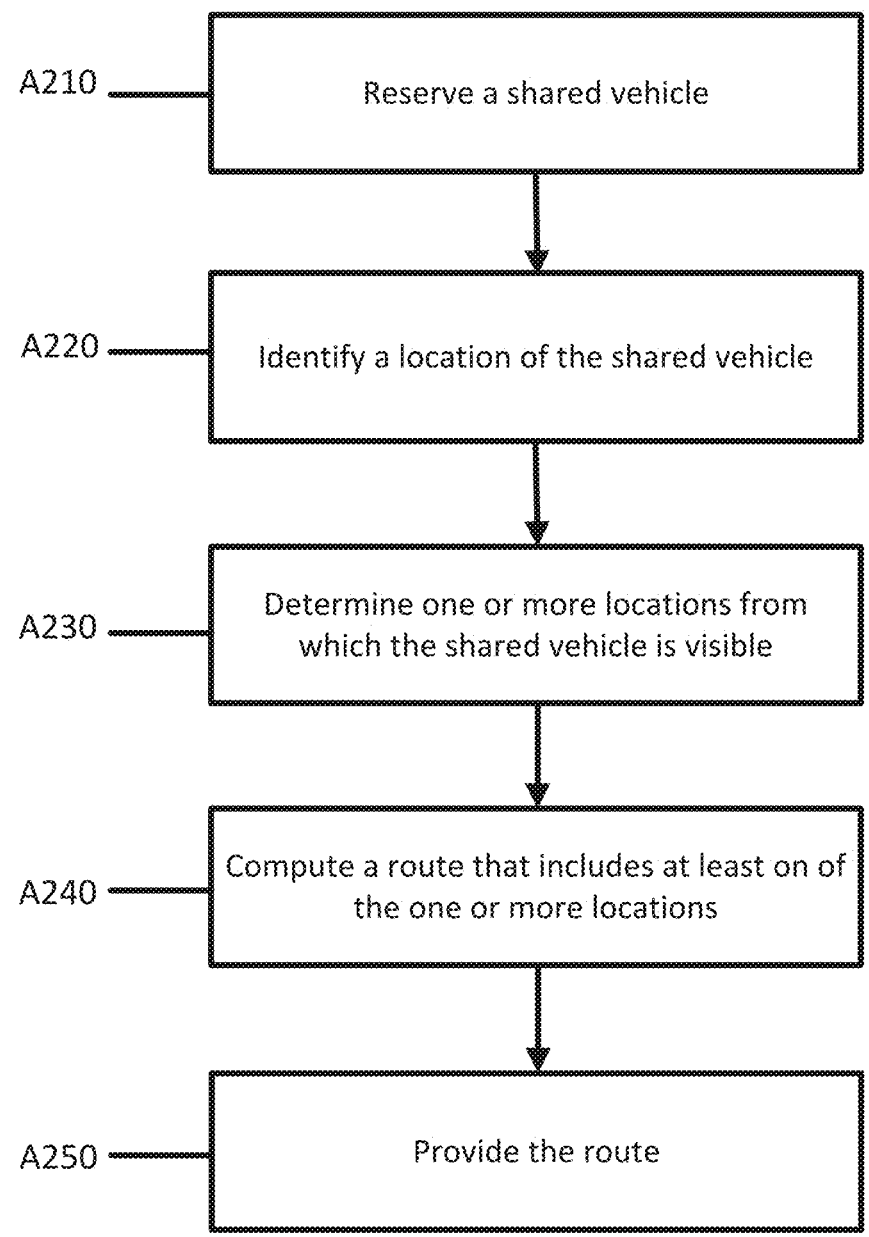
FIG. 11 depicts an example workflow for requesting a more visible route to a destination by the device of FIG. 10.
Figure 12:
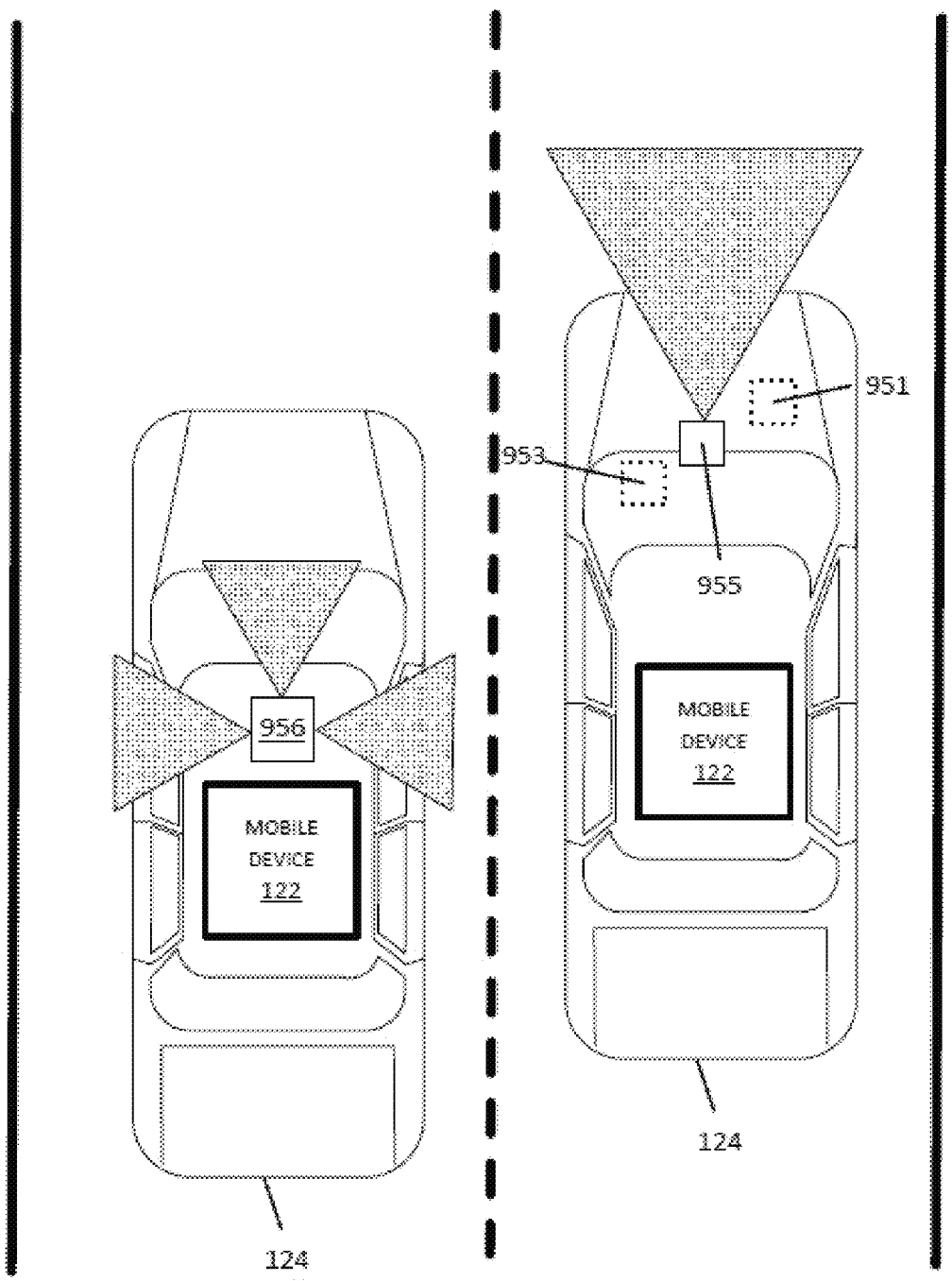
FIG. 12 depicts an example autonomous vehicle according to an embodiment.

FIG. 11 depicts an example workflow for providing a route that prioritizes the discoverability of a shared vehicle 124 using the device 122 of FIG. 12. As presented in the following sections, the acts may be performed using any combination of the components indicated in FIG. 1 or FIG. 12. The following acts may be performed by the server 125, the device 122, the shared vehicle 124, the mapping system 121, or a combination thereof. Additional, different, or fewer acts may be provided. The acts are performed in the order shown or other orders. The acts may also be repeated. Certain acts may be skipped.

At act A210, the controller 900 determines that a user desires to reserve a shared vehicle. The use of a shared vehicle 124 starts with a reservation by a user. The user accesses an application run by the controller and stored in the memory, to reserve a shared vehicle 124. The user may access the application using the user input device 916 or other mechanism. The user input device 916 may be one or more buttons, keypad, keyboard, mouse, stylus pen, trackball, rocker switch, touch pad, voice recognition circuit, or other device or component for inputting data to the mobile device 122. The user input device 916 and display 914 be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers.

At act A220, the controller 900 (e.g., implementing a shared mobility application) identifies the location of the user and the location of potential shared vehicles 124 in the vicinity of the search area. The user selects one of the shared vehicles 124 which is then reserved for that user for a period of time.

At act A230, the controller 900 determines one or more locations from which the location of the shared vehicle 124 is visible. The controller 900 calculates line-of-sight data for multiple points between the origin and destination. The line-of-sight data may be indicative of whether or not the reserved shared vehicle 124 is visible to the user at a particular location. The routing module prioritizes locations from which the shared vehicle 124 is visible (or partially visible). Alternatively, the routing module may determine a plurality of locations from which the shared vehicle 124 is visible and attempt to include those locations in the route At act A240, the controller 900 generates a route or path to the location of the shared vehicle 124. The controller 900 may include a routing module including an application specific module or processor that calculates routing between an origin and destination. The routing module is an example means for generating a route. The routing module is configured to calculate a route or path that optimizes or prioritizes the discoverability or visibility of the shared vehicle 124. The routing instructions may be provided by the display 914. The display 914 is an example means for displaying the routing commands.

Using input(s) including line-of-sight data from, for example, the geographic database 123 or the mapping system 121, the controller 900 examines potential routes between the origin location and the destination location to determine the optimum route. The controller 900 may then provide the user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based in part on a Dijkstra method, an A-star algorithm or search, and/or other route exploration or calculation algorithms that may be modified to take into consideration line-of-sight data from different segments, nodes, or locations on the route. The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

At Act A250, the controller 900 provides the route to the user, for example using the display. The controller 900 may monitor the user as the user traverses the route, for example using the positioning circuitry 922. The positioning circuitry 922 may include suitable sensing devices that measure the traveling distance, speed, direction, and so on, of the mobile device 122. The positioning system may also include a receiver and correlation chip to obtain a GPS signal. Alternatively, or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122. The position circuitry 922 may also include gyroscopes, accelerometers, magnetometers, or any other device for tracking or determining movement of a mobile device 122. The gyroscope is operable to detect, recognize, or measure the current orientation, or changes in orientation, of a mobile device 122. Gyroscope orientation change detection may operate as a measure of yaw, pitch, or roll of the mobile device 122.

The ranging circuitry 923 may include a LiDAR system, a RADAR system, a structured light camera system, SONAR, or any device configured to detect the range or distance to objects from the mobile device 122. The ranging circuitry may also include cameras at different angles and may be capable of maintaining a 360° view of its external environment. The device 122 may utilize three-dimensional cameras for displaying highly detailed and realistic images. These image sensors automatically detect objects, classify them, and determine the distances between them and the device 122. For example, the cameras may easily identify other cars, pedestrians, cyclists, traffic signs and signals, road markings, bridges, and guardrails.

In an embodiment, while monitoring the location of the device 122, at one or more locations along the route, the mobile device 122 may provide a notification or indication that the shared vehicle 124 should be visible. Once the reserved shared vehicle 124 in within a line-of-sight of the user, the user can start looking whether the shared vehicle 124 is according to user's expectations (damaged, size, cleanliness, etc.). If the shared vehicle 124 matches those requirements, the user may continue on the shared vehicle 124 to begin their journey. If the shared vehicle 124 does not match those requirements (for example is missing a seat, has a flat tire, is damaged), the user may opt to select or look for another shared vehicle 124.

In an embodiment, the shared vehicle 124 identifies its location and transmits its location to the device 122. The device 122 may communicate with the shared vehicle 124 using the radio 909 or communications interface 918. The radio 909 may be configured to radio frequency communication (e.g., generate, transit, and receive radio signals) for any of the wireless networks described herein including cellular networks, the family of protocols known as WIFI or IEEE 802.11, the family of protocols known as Bluetooth, or another protocol. The communication interface 918 may include any operable connection. An operable connection may be one in which signals, physical communications, and/or logical communications may be sent and/or received. An operable connection may include a physical interface, an electrical interface, and/or a data interface. The communication interface 918 provides for wireless and/or wired communications in any now known or later developed format.

In an embodiment, the device 122 may be equipped with a camera that is configured to acquire an image. A zoom feature on the camera may be used to identify or see shared vehicles 124 from far away (for example using a head mounted device). The device 122 may also make use of augmented reality to overlay an icon in the image that identifies or otherwise highlights the reserved shared vehicle 124. In this way, the user may be able to identify a particular vehicle at a location, for example, among many vehicles parked or stored at that location.

The device 122 may store line-of-sight data and visibility information for locations in the memory 904. The memory 904 may be a volatile memory or a non-volatile memory. The memory 904 may include one or more of a read-only memory (ROM), random access memory (RAM), a flash memory, an electronic erasable program read only memory (EEPROM), or other type of memory. The memory 904 may be removable from the mobile device 122, such as a secure digital (SD) memory card. The line-of-sight data and visibility information for locations may be acquired by communicating with the communications interface 918.

FIG. 12 illustrates exemplary shared vehicles 124 for providing location-based services or application using the systems and methods described herein as well as collecting data for such services or applications described herein. The shared vehicles 124 may include a variety of devices that collect position data as well as other related sensor data for the surroundings of the shared vehicle 124, here depicted as a car, but which use and configuration may be applied to bikesharing, scootersharing, or other shared vehicles 124. The position data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively, or additionally, the one or more detectors or sensors may include an accelerometer built or embedded into or within the interior of the vehicle 124. The vehicle 124 may include one or more distance data detection device or sensor, such as a LiDAR device. The distance data detection sensor may include a laser range finder that rotates a mirror directing a laser to the surroundings or vicinity of the collection vehicle on a roadway or another collection device on any type of pathway.

A connected vehicle includes a communication device and an environment sensor array for reporting the surroundings of the shared vehicle 124 to the mapping system 121. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and the mapping system 121. The network may be the Internet or connected to the internet.

The sensor array may include one or more sensors configured to detect surroundings of the shared vehicle 124. The sensor array may include multiple sensors. Example sensors include an optical distance system such as LiDAR 956, an image capture system 955 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera, or another camera.

In some alternatives, additional sensors may be included in the shared vehicle 124. An engine sensor 951 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 953, may include a steering wheel angle sensor, a speedometer sensor, or a tachometer sensor.

A mobile device 122 may be integrated in the shared vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the shared vehicle 124. The assisted driving device may include memory, a processor, and systems to communicate with the mobile device 122. The assisted driving vehicles may respond to the lane marking indicators (lane marking type, lane marking intensity, lane marking color, lane marking offset, lane marking width, or other characteristics) received from geographic database 123 and the mapping system 121 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) received from geographic database 123 and the mapping system 121 and driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to lane marking indicators (lane marking type, lane marking intensity, lane marking color, lane marking offset, lane marking width, or other characteristics) received from geographic database 123 and the mapping system 121 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) received from geographic database 123 and the mapping system 121 and driving commands or navigation commands.

The term "computer-readable medium" includes a single medium or multiple medium, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionalities as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in the specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory may be supplemented by, or incorporated in, special purpose logic circuitry.

To provide for interaction with a user, embodiments of the subject matter described in this specification may be implemented on a device having a display, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the subject matter described in this specification may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the subject matter described in this specification, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The invention claimed is:

1. A method comprising:
receiving, by a processor, a request for directions to a shared vehicle;
calculating, by the processor, a plurality of pedestrian paths to a location of the shared vehicle;
determining, by the processor, line-of-sight data for one or more locations on the plurality of pedestrian paths to the location of the shared vehicle;
selecting, by the processor, a pedestrian path from the plurality of pedestrian paths based at least on the line-of-sight data; and
providing, by the processor, the pedestrian path.

2. The method of claim 1, wherein the request is received from a shared mobility application.

3. The method of claim 1, wherein the line-of-sight data for the one or more locations is determined using a three-dimensional map.

4. The method of claim 1, further comprising:
generating a notification for a waypoint included in the pedestrian path that includes an unobstructed line-of-sight to the shared vehicle.

5. The method of claim 1, wherein the pedestrian path is further selected based at least on a distance of each of the plurality of pedestrian paths.

6. The method of claim 5, wherein a visibility of the shared vehicle based on the line-of-sight data is prioritized over the distance when computing the pedestrian path.

7. The method of claim 1, wherein selecting comprises:
determining, by the processor, based on the line-of-sight data, one or more waypoints that include an unobstructed line-of-sight to the location of the shared vehicle; and
computing the pedestrian path using at least one waypoint of the one or more waypoints.

8. The method of claim 1, wherein the line-of-sight data is determined based on dynamic factors including at least one of weather, seasonal obstacles, or lighting.

9. A system for computing a route to a shared vehicle, the system comprising:

a geographic database configured to store a three-dimensional map;

a routing processor configured to compute, using the three-dimensional map, the route that prioritizes a shared vehicle's discoverability from a starting location to the shared vehicle, wherein the routing processor is configured to compute the route by prioritizing a visibility of the shared vehicle from one or more waypoints in the route over a travel time of the route; and a transceiver configured to receive routing requests and transmit computed routes.

10. The system of claim 9, wherein the visibility of the shared vehicle is determined based at least on line-of-sight data derived from the three-dimensional map.

11. The system of claim 10, wherein the line-of-sight data is determined based on dynamic factors including at least one of weather, seasonal obstacles, or lighting.

12. The system of claim 9, wherein the routing processor is further configured to compute the route based on visibility of other shared vehicles along the route.

13. The system of claim 9, wherein the route is a pedestrian path and the shared vehicle comprises a micro-mobility vehicle.

14. A method comprising:
reserving, by a mobile device, a shared vehicle;
identifying, by the mobile device, a location of the shared vehicle;
determining, by the mobile device, one or more locations from which the location of the shared vehicle is visible, wherein determining the one or more locations comprises computing line-of-sight data using a three-dimensional map;
computing, by the mobile device, a route that includes a waypoint including at least one of the one or more locations; and
providing, by the mobile device, the route.

15. The method of claim 14, wherein the shared vehicle comprises a shared bicycle or shared scooter.

16. The method of claim 14, further comprising:
generating, by the mobile device, a notification for a user that the shared vehicle is visible at a current location of the user along the route.

17. The method of claim 14, wherein providing comprises proving turn by turn directions using a display on the mobile device.

18. The method of claim 14, further comprising:
providing a visual indicator of the location of the shared vehicle in a head mounted display of the mobile device.

* * * * *